US008959257B2

(12) United States Patent
Suda et al.

(10) Patent No.: US 8,959,257 B2
(45) Date of Patent: Feb. 17, 2015

(54) INFORMATION PROCESSING APPARATUS AND INFORMATION PROCESSING METHOD

(71) Applicant: Kabushiki Kaisha Toshiba, Minato-ku, Tokyo (JP)

(72) Inventors: Hajime Suda, Hamura (JP); Masami Tanaka, Ome (JP); Hideki Miyasato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/937,992

(22) Filed: Jul. 9, 2013

(65) Prior Publication Data

US 2015/0019761 A1    Jan. 15, 2015

(51) Int. Cl.
*G06F 3/00* (2006.01)
*G06F 11/30* (2006.01)
*G06F 13/20* (2006.01)

(52) U.S. Cl.
CPC .................................. *G06F 11/3051* (2013.01)
USPC .............................. 710/16; 710/38; 710/313

(58) Field of Classification Search
CPC ............ G06F 3/00; G06F 13/20; G06F 1/266
USPC .................... 710/15–19, 36–38, 313
See application file for complete search history.

(56) References Cited

U.S. PATENT DOCUMENTS

| | | | | |
|---|---|---|---|---|
| 7,788,428 B2* | 8/2010 | Melin | | 710/62 |
| 7,873,980 B2* | 1/2011 | Horan et al. | | 725/128 |
| 8,275,914 B2* | 9/2012 | Kim et al. | | 710/15 |
| 8,279,248 B2* | 10/2012 | Moto et al. | | 347/211 |
| 8,479,248 B2* | 7/2013 | Horan et al. | | 725/127 |
| 8,484,387 B2* | 7/2013 | Kim et al. | | 710/11 |
| 8,601,173 B2* | 12/2013 | Sung et al. | | 710/15 |
| 8,683,087 B2* | 3/2014 | Connolly | | 710/11 |
| 2009/0248924 A1* | 10/2009 | Melin | | 710/63 |
| 2012/0036284 A1 | 2/2012 | Tao et al. | | |
| 2012/0226921 A1* | 9/2012 | Kim | | 713/310 |
| 2012/0265911 A1* | 10/2012 | Connolly | | 710/300 |
| 2013/0014199 A1* | 1/2013 | Horan et al. | | 725/127 |
| 2013/0179603 A1* | 7/2013 | Tu et al. | | 710/15 |
| 2013/0326796 A1* | 12/2013 | Cunliffe | | 2/247 |
| 2014/0189892 A1* | 7/2014 | Nair | | 726/36 |
| 2014/0250254 A1* | 9/2014 | Lee et al. | | 710/313 |

FOREIGN PATENT DOCUMENTS

| | | |
|---|---|---|
| JP | 2010-152918 A | 7/2010 |
| JP | 2011-205164 A | 10/2011 |

* cited by examiner

*Primary Examiner* — Christopher Shin
(74) *Attorney, Agent, or Firm* — Knobbe, Martens, Olson & Bear LLP

(57) ABSTRACT

According to one embodiment, a first controller is connected to one of a plurality of terminals. A detector is configured to detect a connection between each of the plurality of terminals and an MHL cable. A power supply module supplies electric power to a first connected apparatus connected via a first MHL cable in response to a first connection detection between a first terminal and the first MHL cable. A second controller is configured to connect the first terminal and the first controller, in response to the first connection detection, and to connect a second terminal and the first controller, when a signal is not received from the first connected apparatus via the first terminal at a timing of a second connection detection between the second terminal and a second MHL cable.

12 Claims, 5 Drawing Sheets

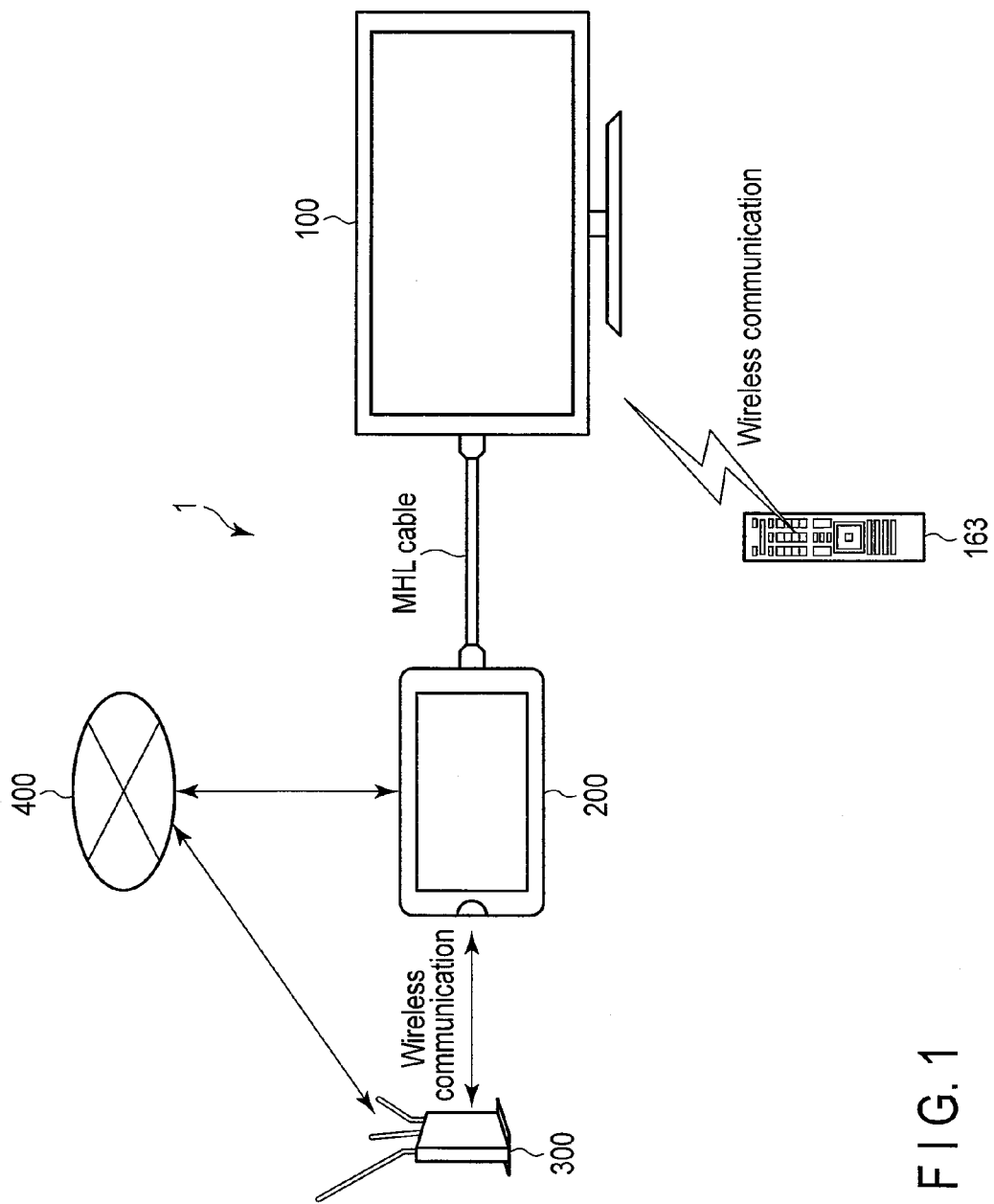
F I G. 1

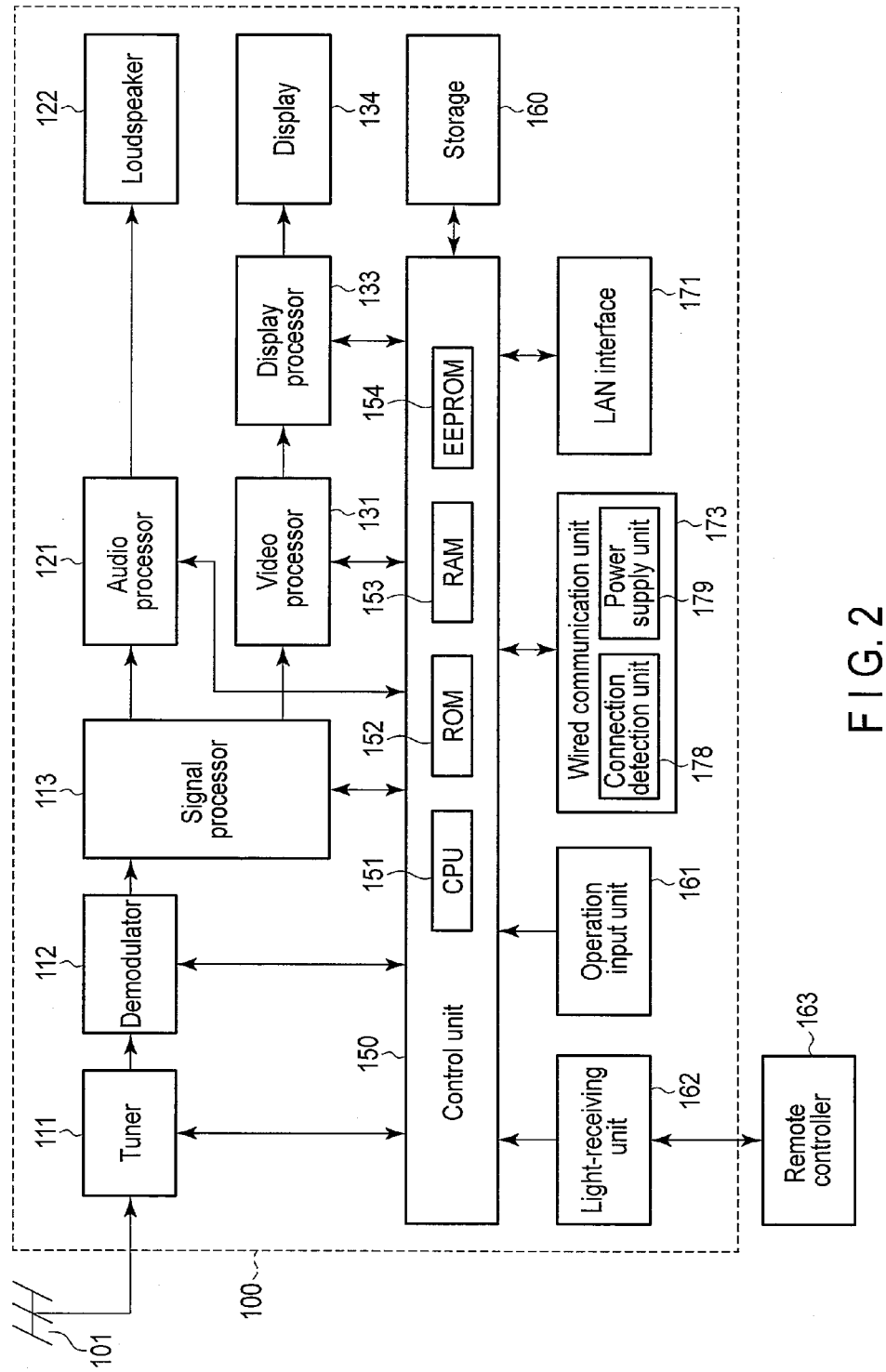
F I G. 2

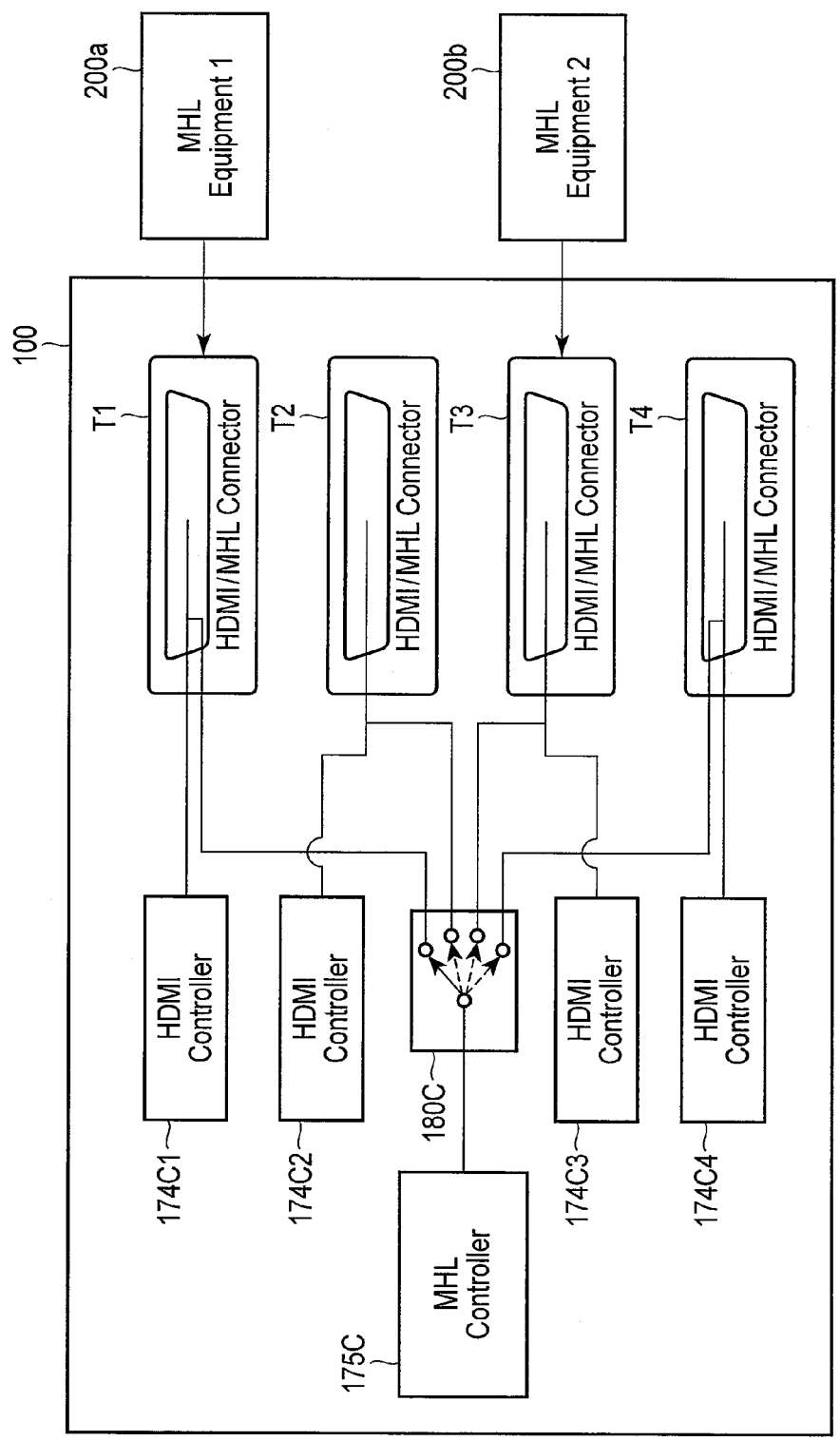
F I G. 5

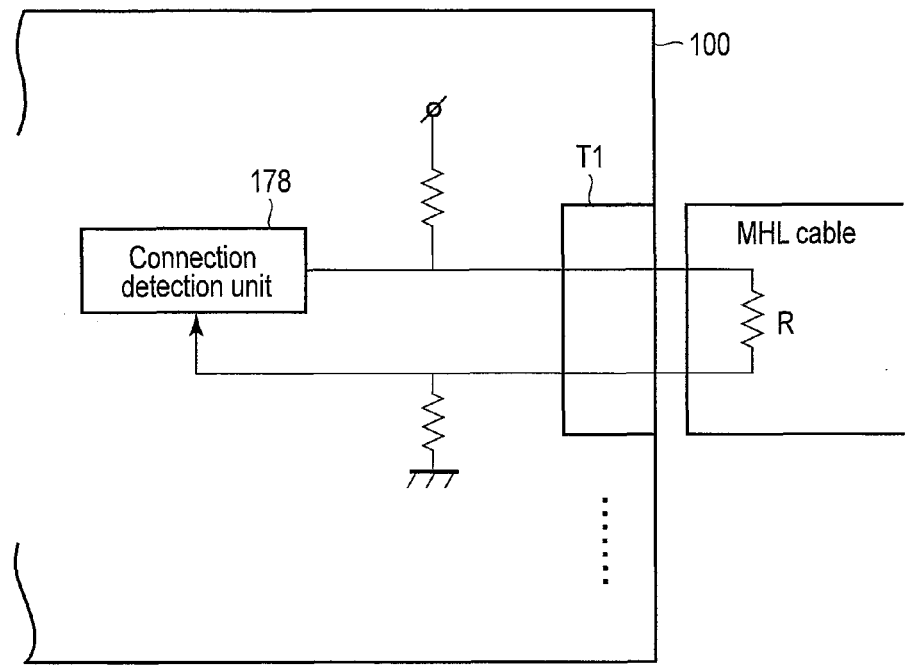
F I G. 6
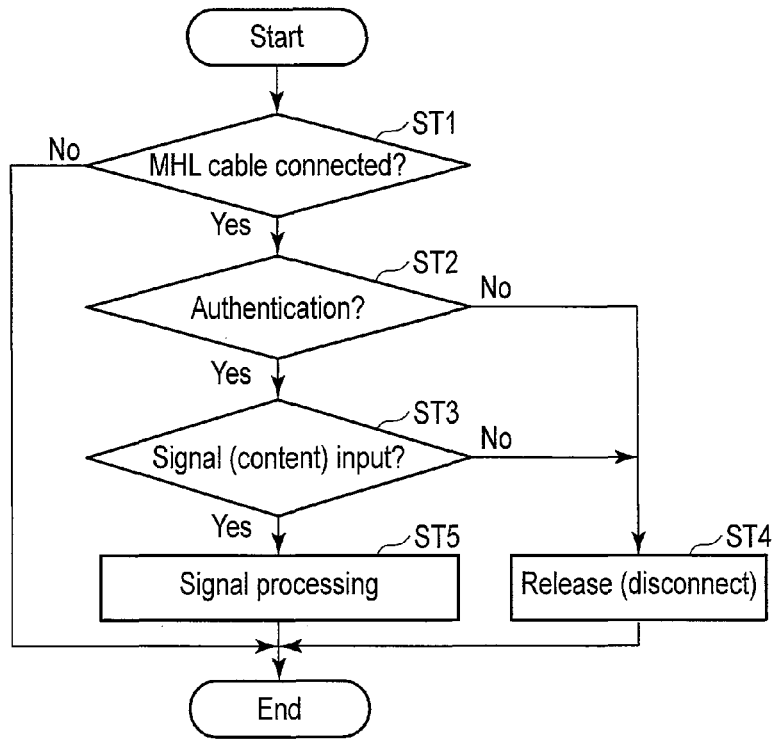
F I G. 7

INFORMATION PROCESSING APPARATUS AND INFORMATION PROCESSING METHOD

FIELD

Embodiments described herein relate generally to an information processing apparatus and information processing method.

BACKGROUND

Conventionally, electronic apparatuses which can record (video-record) and play back movies, television programs, or video contents (streams) of games or the like have generally prevailed.

Also, electronic apparatuses which support standards, for transfer a stream, such as HDMI (High Definition Multimedia Interface)® and MHL (Mobile High-definition Link)® have generally prevailed.

An electronic apparatus (source) on the stream output side outputs a stream to that (sink) on the stream reception side. The sink plays back the received stream, and displays a played-back video on a display. When the source and sink are connected via MHL, they mutually operate and control partner apparatuses. Furthermore, the sink can supply electric power to the source via an MHL cable.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram for explaining a transmission/reception system according to one embodiment;

FIG. 2 is a diagram for explaining the transmission/reception system according to one embodiment;

FIG. 5 is a diagram showing the arrangement of a wired communication unit of a video processing apparatus according to one embodiment, and a connection example between two MHL equipments;

FIG. 6 is a diagram for explaining an insertion detection (connection detection) example of an MHL cable; and FIG. 7 is a flowchart showing an example of processing upon connection of the MHL cable.

DETAILED DESCRIPTION

Figure 3:
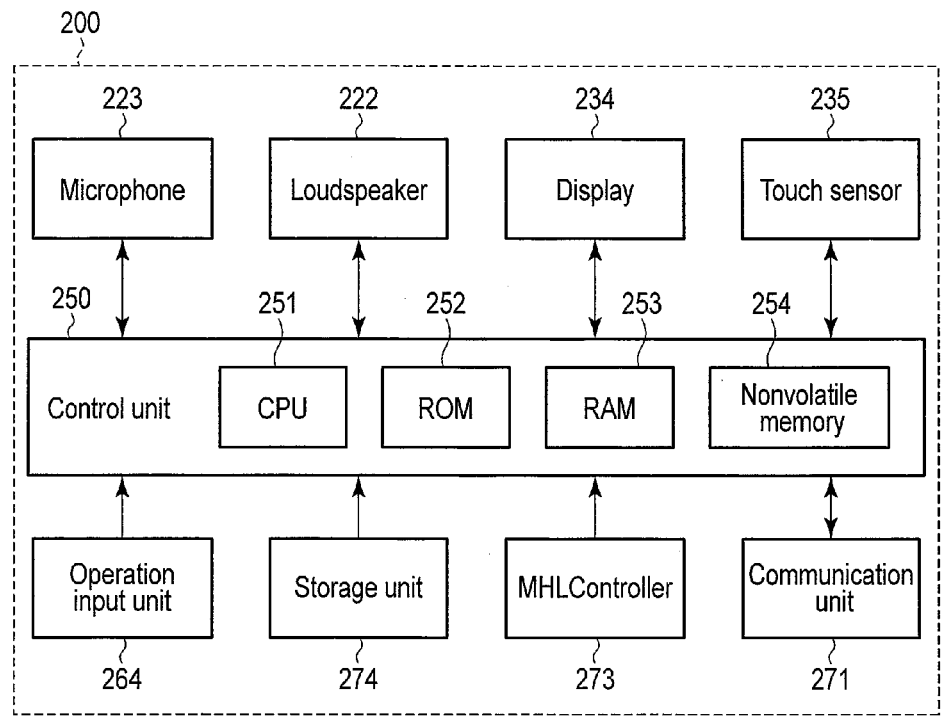
FIG. 3 is a diagram for explaining the transmission/reception system according to one embodiment.

Various embodiments will be described hereinafter with reference to the accompanying drawings.

In general, according to one embodiment, an information processing apparatus includes a plurality of terminals, first controller, detector, power supply module, and second controller. The first controller is configured to connect with one of the plurality of terminals and to process a signal from the connected terminal. The detector is configured to detect a connection between each of the plurality of terminals and an MHL cable compliant with the MHL standard. The power supply module is configured to supply electric power to a first connected apparatus connected via a first MHL cable in response to a first connection detection between a first terminal and the first MHL cable. The second controller is configured to connect the first terminal and the first controller in response to the first connection detection, and to connect a second terminal and the first controller when a signal is not received from the first connected apparatus via the first terminal at a timing of a second connection detection between the second terminal and a second MHL cable.

A transmission apparatus, reception apparatus, and transmission/reception system according to one embodiment will be described in detail hereinafter with reference to the drawings.

FIG. 1 shows an example of a transmission/reception system 1 including a plurality of electronic apparatuses. The transmission/reception system 1 includes, for example, a video processing apparatus 100, portable terminal 200, wireless communication terminal 300, and the like.

The video processing apparatus 100 is an electronic apparatus which can play back, for example, a broadcast signal or video contents and the like stored in a storage medium. The video processing apparatus 100 can make wireless communications with a remote controller 163.

The portable terminal 200 is an electronic apparatus which includes a display, operation unit, and communication unit. The portable terminal 200 is, for example, a mobile phone terminal, tablet type PC, portable music player, game machine, DVD (Digital Versatile Disc) recorder, set-top box, or other electronic apparatuses.

The wireless communication terminal 300 can communicate with the video processing apparatus 100 and portable terminal 200 via wireless or wired communications. That is, the wireless communication terminal 300 functions as an access point of a wireless communication. Also, the wireless communication terminal 300 can establish a connection to a network 400 of an external cloud service or the like. That is, the wireless communication terminal 300 can access the network 400 in response to a request from the video processing apparatus 100 or portable terminal 200. Thus, the video processing apparatus 100 and portable terminal 200 can acquire various data from a server on the network 400 via the wireless communication terminal 300.

Also, the video processing apparatus 100 is connected to the portable terminal 200 via a communication cable compliant with MHL (MHL cable). The MHL cable has a terminal of a shape compliant with the HDMI standard (HDMI terminal) on one end, and a terminal of a shape compliant with the USB standard (for example, micro USB) on the other end.

The MHL is an interface standard which can transfer moving image data (stream) including a video and moving image. With the MHL, an electronic apparatus on the stream output side (source) outputs a stream to an electronic apparatus on the stream reception side (sink) via the MHL cable. The sink can play back the received stream, and can display a played-back video on a display. The source and sink can operate and control partner apparatuses by transmitting commands to the apparatuses connected via the MHL cable.

FIG. 2 shows an example of the video processing apparatus 100 according to one embodiment.

The video processing apparatus 100 is, for example, an electronic apparatus such as a broadcast receiver or recorder, which can play back a broadcast signal or video contents stored in a storage medium.

The video processing apparatus 100 includes a tuner 111, demodulator 112, signal processor 113, audio processor 121, video processor 131, display processor 133, control unit 150, storage 160, operation input unit 161, light-receiving unit 162, LAN interface 171, and wired communication unit 173. Also, the video processing apparatus 100 further includes a loudspeaker 122 and display 134.

The tuner 111 can receive, for example, a digital broadcast signal received by an antenna 101. The antenna 101 can receive, for example, a terrestrial digital broadcast signal, BS (Broadcasting Satellite) digital broadcast signal, and/or 110° CS (Communication Satellite) digital broadcast signal. The tuner 111 can receive data (stream) of a program and the like supplied by the digital broadcast signal.

The tuner 111 is a digital broadcast signal tuner. The tuner 111 tunes (a channel of) the received digital broadcast signal. The tuner 111 transmits the tuned digital broadcast signal to the demodulator 112. Note that the video processing apparatus 100 may include a plurality of tuners 111. The video processing apparatus 100 can simultaneously tune a plurality of broadcast signals using the plurality of tuners.

The demodulator 112 demodulates the received digital broadcast signal. Thus, the demodulator 112 acquires moving image data such as a transport stream (TS) (to be referred to as a stream hereinafter) from the digital broadcast signal. The demodulator 112 inputs the acquired stream to the signal processor 113. Note that the video processing apparatus 100 may include a plurality of demodulators 112. The plurality of demodulators 112 can respectively demodulate a plurality of signals tuned by the plurality of tuners 111.

As described above, the antenna 101, tuner 111, and demodulator 112 function as a reception unit which receives a stream.

The signal processor 113 executes signal processing such as demultiplexing of a stream. That is, the signal processor 113 demultiplexes the stream into a digital video signal, digital audio signal, and another data signal. Note that the signal processor 113 can demultiplex a plurality of streams demodulated by the plurality of demodulators 112. The signal processor 113 supplies the digital audio signal to the audio processor 121. Also, the signal processor 113 supplies the digital video signal to the video processor 131. Furthermore, the signal processor 113 supplies the data signal to the control unit 150.

Moreover, the signal processor 113 can convert the stream into data in a recordable state (recording stream) under the control of the control unit 150. The signal processor 113 can supply the recording stream to the storage 160 or other modules under the control of the control unit 150.

In addition, the signal processor 113 can convert (transcode) a bit rate of the stream from an original bit rate to another bit rate. That is, the signal processor 113 can transcode the stream of the original bit rate acquired based on the broadcast signal or the like into that of a lower bit rate. Thus, the signal processor 113 can record a content to have a smaller size.

The audio processor 121 converts the digital audio signal received from the signal processor 113 into a signal of a format (audio signal) which can be played back via the loudspeaker 122. For example, the audio processor 121 converts the digital audio signal into an audio signal by digital/analog conversion. The audio processor 121 supplies the audio signal to the loudspeaker 122. The loudspeaker 122 plays back a sound based on the supplied audio signal.

The video processor 131 converts the digital video signal received from the signal processor 113 into a video signal of a format which can be played back on the display 134. That is, the video processor 131 decodes (reproduces) the digital video signal received from the signal processor 113 into a video signal of a format which can be played back on the display 134. The video processor 131 outputs the video signal to the display processor 133.

The display processor 133 applies, for example, image quality adjustment processing of a color, brightness, sharpness, contrast, and the like to the received video signal under the control of the control unit 150. The display processor 133 supplies the video signal, which has undergone the image quality adjustment, to the display 134. The display 134 displays a video based on the supplied video signal.

The display 134 includes, for example, a liquid crystal display device including a liquid crystal display panel including a plurality of pixels arranged in a matrix, and a backlight which illuminates this liquid crystal panel. The display 134 displays a video based on the video signal supplied from the display processor 133.

Note that the video processing apparatus 100 may have an arrangement including an output terminal required to output a video signal in place of the display 134. The video processing apparatus 100 may have an arrangement including an output terminal required to output an audio signal in place of the loudspeaker 122. The video processing apparatus 100 may have an arrangement including output terminals required to output a digital video signal and digital audio signal.

The control unit 150 functions as a control unit which controls the operations of the respective units of the video processing apparatus 100. The control unit 150 includes a CPU 151, ROM 152, RAM 153, EEPROM (nonvolatile memory) 154, and the like. The control unit 150 executes various kinds of processing based on an operation signal supplied from the operation input unit 161.

The CPU 151 includes an arithmetic element and the like used to execute various kinds of arithmetic processing. The CPU 151 implements various functions by executing programs stored in the ROM 152, EEPROM 154, or the like.

The ROM 152 stores a program required to control the video processing apparatus 100 and those required to implement various functions. The CPU 151 launches the programs stored in the ROM 152 based on an operation signal supplied from the operation input unit 161. Thus, the control unit 150 controls the operations of the respective units.

The RAM 153 functions as a work memory of the CPU 151. That is, the RAM 153 stores the arithmetic result of the CPU 151, data loaded by the CPU 151, and the like.

The EEPROM 154 is a nonvolatile memory which stores various kinds of setting information, programs, and the like.

The storage 160 includes a storage medium used to store contents. For example, the storage 160 is configured by an HDD (Hard Disk Drive), SSD (Solid State Drive), semiconductor memory, or the like. The storage 160 can store a recording stream supplied from the signal processor 113.

The operation input unit 161 includes, for example, an operation key, a touch pad, or the like, which is used to generate an operation signal in response to an operation input by the user. The operation input unit 161 may have an arrangement which can receive an operation signal from a keyboard, mouse, or another input device which can generate an operation signal. The operation input unit 161 supplies an operation signal to the control unit 150.

Note that the touch pad includes a device which generates position information based on a capacitance type sensor, thermo sensor, or other methods. When the video processing apparatus 100 includes the display 134, the operation input unit 161 may have an arrangement including, for example, a touch panel integrally formed on the display 134.

The light-receiving unit 162 includes, for example, a sensor which receives an operation signal from the remote control unit 163, and the like. The light-receiving unit 162 supplies the received signal to the control unit 150. The control unit 150 receives the signal supplied from the light-receiving unit 162, amplifies the received signal, and A/D-converts that signal, thus decoding an original operation signal transmitted from the remote control unit 163.

The remote control unit 163 generates an operation signal based on an operation input by the user. The remote control unit 163 transmits the generated operation signal to the light-receiving unit 162 via an infrared communication. Note that the light-receiving unit 162 and remote control unit 163 may have an arrangement which exchanges an operation signal via another wireless communication such as radio waves.

The LAN interface 171 can communicate with another apparatus on the network 400 via the wireless communication terminal 300 by a LAN or wireless LAN. Thus, the video processing apparatus 100 can communicate with another apparatus connected to the wireless communication terminal 300. For example, the video processing apparatus 100 can acquire and play back a stream recorded in an apparatus on the network 400 via the LAN interface 171.

The wired communication unit 173 is an interface which makes communications based on the HDMI and MHL standards and the like. The wired communication unit 173 includes a plurality of HDMI/MHL connectors (see FIG. 5) which can connect an HDMI cable and can connect an MHL cable in place of an HDMI cable, a plurality of HDMI controllers (see FIG. 5) which execute signal processing based on the HDMI standard, and an MHL controller (see FIG. 5) which executes signal processing based on the MHL standard. Furthermore, the wired communication unit 173 includes a connection detection unit 178 and power supply unit 179 which supplies electric power via a connected MHL cable in response to a connection detection of the MHL cable.

Note that a terminal on a side connected to the video processing apparatus 100 of the MHL cable has a structure compatible with the HDMI cable. Note that in the MHL cable, a resistor is connected between terminals (detection terminals) which are not used in communications. The connection detection unit 178 of the wired communication unit 173 applies a voltage across the detection terminals, thereby recognizing whether an MHL cable is connected or HDMI cable is connected to the HDMI/MHL connector.

The video processing apparatus 100 can receive and play back a stream output from an apparatus (source) connected to the HDMI/MHL connector of the wired communication unit 173.

The control unit 150 controls to input a stream received by the wired communication unit 173 to the signal processor 113. The signal processor 113 demultiplexes the received stream into a digital video signal, digital audio signal, and the like. The signal processor 113 transmits the demultiplexed digital video signal to the video processor 131 and the demultiplexed digital audio signal to the audio processor 121. Thus, the video processing apparatus 100 can play back the stream received by the wired communication unit 173.

The video processing apparatus 100 includes a power source unit (not shown). The power source unit receives electric power from a commercial power source or the like via an AD adapter or the like. The power source unit converts the received AC electric power into DC electric power, and supplies that electric power to the respective units in the video processing apparatus 100.

FIG. 3 shows an example of the portable terminal 200 according to one embodiment.

The portable terminal 200 includes a control unit 250, operation input unit 264, communication unit 271, MHL controller 273, and storage device 274. Furthermore, the portable terminal 200 includes a loudspeaker 222, microphone 223, display 234, and touch sensor 235.

The control unit 250 functions as that which controls operations of respective units of the portable terminal 200. The control unit 250 includes a CPU 251, ROM 252, RAM 253, nonvolatile memory 254, and the like. The control unit 250 executes various kinds of processing based on an operation signal supplied from the operation input unit 264 or touch sensor 235.

The CPU 251 includes an arithmetic element and the like used to execute various kinds of arithmetic processing. The CPU 251 implements various functions by executing programs stored in the ROM 252, nonvolatile memory 254, or the like.

The ROM 252 stores a program required to control the portable terminal 200, those required to implement various functions, and the like. The CPU 251 launches programs stored in the ROM 252 based on an operation signal supplied from the operation input unit 264. Thus, the control unit 250 controls the operations of the respective units.

The RAM 253 functions as a work memory of the CPU 251. That is, the RAM 253 stores the arithmetic result of the CPU 251, data loaded by the CPU 251, and the like.

The nonvolatile memory 254 stores various kinds of setting information, programs, and the like.

The CPU 251 can execute various kinds of processing based on data such as applications stored in the storage device 274.

The control unit 250 can generate video signals to be displayed such as various screens according to the applications executed by the CPU 251, and can display these screens on the display 234. Also, the control unit 250 can generate audio signals to be played back such as various audios according to the applications executed by the CPU 251, and can output these audios via the loudspeaker 222.

The loudspeaker 222 plays back a sound based on the supplied audio signal.

The microphone 223 is a sound collecting unit which generates a signal (sound recording signal) based on an external sound of the portable terminal 200. The microphone 223 supplies the sound recording signal to the control unit 250.

The display 234 includes, for example, a liquid crystal display device including a liquid crystal display panel including a plurality of pixels arranged in a matrix, and a backlight which illuminates this liquid crystal panel. The display 234 displays a video based on the video signal.

The touch sensor 235 is a device which generates position information based on a capacitance type sensor, thermo sensor, or other methods. For example, the touch sensor 235 is formed integrally with the display 234. This allows the touch sensor 235 to generate an operation signal based on an operation on a screen displayed on the display 234, and supply the operation signal to the control unit 250.

Note that when no operation is input for a predetermined period of time or more, the control unit 250 transits to a lock state (screen lock) so as to prevent operation errors of the touch sensor 235. In the lock state, the portable terminal 200 limits some operation inputs. For example, in the lock state, the portable terminal 200 invalidates operations except for a predetermined operation by the touch sensor 235 and those except for a predetermined operation by the operation input unit 264.

When a pre-set operation input (unlock operation) is input in the lock state, the portable terminal 200 unlocks the lock state. For example, in the lock state, the portable terminal 200 accepts only a pre-set operation input by the operation input unit 264 or touch sensor 235.

The operation input unit 264 includes, for example, keys each used to generate an operation signal according to an operation input by the user. The operation input unit 264 includes, for example, a tone volume adjustment key used to adjust a tone volume, a luminance adjustment key used to adjust display luminance of the display 234, a power key used to switch a power source state of the portable terminal 200, and the like. Also, the operation input unit 264 may further include a track ball required to control the portable terminal 200 to execute various selection operations. The operation input unit 264 generates an operation signal according to the key operation, and supplies the operation signal to the control unit 250.

The operation input unit 264 may have an arrangement which receives an operation signal from a keyboard, mouse, or another input device which can generate an operation signal. For example, when the portable terminal 200 includes a USB terminal, Bluetooth® module, or the like, the operation input unit 264 receives an operation signal from an input device connected via USB or Bluetooth, and supplies that signal to the control unit 250.

The communication unit 271 can communicate with another apparatus on the network 400 via a LAN or wireless LAN and the wireless communication terminal 300. Also, the communication unit 271 can communicate with another apparatus on the network 400 via a mobile phone network. Thus, the portable terminal 200 can communicate with another apparatus connected to the wireless communication terminal 300. For example, the portable terminal 200 can acquire and play back moving images, photos, music data, Web contents, and the like recorded in an apparatus on the network 400 via the communication unit 271.

The MHL controller 273 is an interface which makes communications based on the MHL standard. The MHL controller 273 executes signal processing based on the MHL standard. The MHL controller 273 has a USB terminal (not shown) which can connect an MHL cable.

The portable terminal 200 can output a stream to an apparatus (sink) connected to the USB terminal of the MHL controller 273.

Furthermore, the MHL controller 273 can multiplex a video signal to be displayed and audio signal to be played back to generate a stream.

For example, when an MHL cable is connected to the USB terminal of the MHL controller 273, and the portable terminal 200 operates as a source, the control unit 250 supplies a video signal to be displayed and audio signal to be played back to the MHL controller 273. The MHL controller 273 can generate streams of various formats (for example, 1080i, 60 Hz) using the video signal to be displayed and audio signal to be played back. The control unit 250 can output the generated stream to the sink connected to the USB terminal.

The portable terminal 200 includes a power source unit (not shown). The power source unit includes a battery, and a terminal (for example, a DC plug) required to connect an adapter which receives electric power from a commercial power source or the like. The power source unit receives electric power from the commercial power source to charge the battery. The power source unit supplies the power charged in the battery to the respective units in the portable terminal 200.

The storage device 274 includes an HDD (Hard Disk Drive), SSD (Solid State Drive), semiconductor memory, or the like. The storage device 274 can store programs executed by the CPU 251 of the control unit 250, applications, contents such as moving images, various data, and the like.

Figure 4:
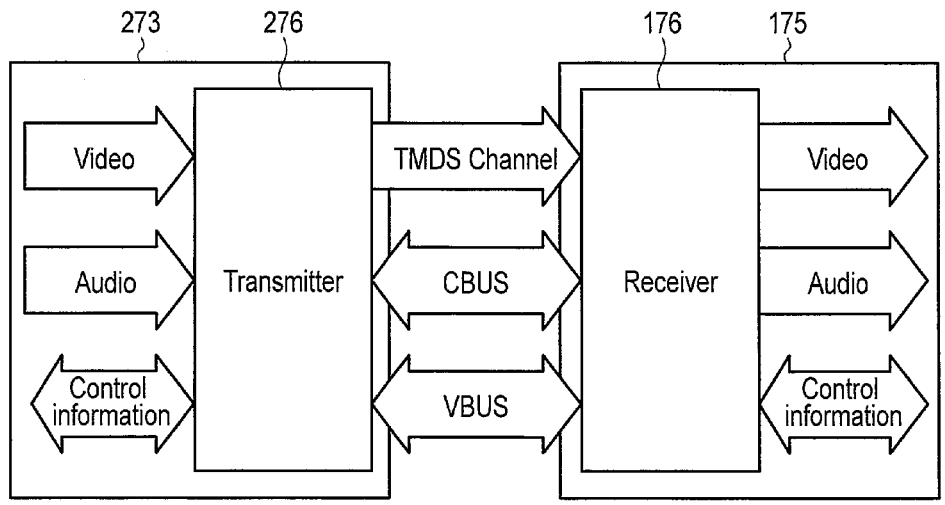
FIG. 4 is a diagram for explaining the transmission/reception system according to one embodiment.

FIG. 4 shows a communication example based on the MHL standard. In the following description of this embodiment, assume that the portable terminal 200 is a source and the video processing apparatus 100 is a sink.

The MHL controller 273 of the portable terminal 200 includes a transmitter 276 and a receiver (not shown). On the other hand, an MHL controller 175C of the video processing apparatus 100 includes a transmitter (not shown) and a receiver 176.

The transmitter 276 and receiver 176 are connected via an MHL cable. The MHL cable includes lines VBUS, GND, CBUS, MHL+, MHL−, and the like.

The line VBUS is used to transmit electric power. For example, the sink supplies electric power of +5 V to the source via the line VBUS. The source can operate using electric power supplied from the sink via the line VBUS. For example, the power source unit of the portable terminal 200 as the source can charge electric power supplied from the sink via the line VBUS on the battery. The line GND is grounded.

The line CBUS is used to transmit, for example, a control signal such as a command. The line CBUS is used to transmit, for example, a DDC (Display Data Channel) command, MSC (MHL Sideband Channel) command, or the like in two ways. The DDC command is used to read out EDID (Extended Display Identification Data), in HDCP (High-bandwidth Digital Content Protection) authentication, and so forth. The EDID is a list of display information, which is set in advance according to the specification of the display or the like. The MSC command is used in read/write control of various registers (not shown), remote controller control, and so forth.

For example, the video processing apparatus 100 as the sink outputs commands to the portable terminal 200 as the source via the line CBUS. The portable terminal 200 can execute various kinds of processing according to the received commands.

The source transmits the DDC command to the sink to execute HDCP authentication with the sink, and can read out the EDID from the sink.

The HDCP is an encryption method of signals transmitted between the apparatuses. The video processing apparatus 100 and portable terminal 200 exchange keys and the like in the sequence compliant with the HDCP, thus attaining mutual authentication.

Note that the portable terminal 200 may have an arrangement which acquires EDID from the video processing apparatus 100 not during the HDCP authentication but at another timing.

The portable terminal 200 analyzes the EDID acquired from the video processing apparatus 100, and recognizes display information indicating a format including a resolution, color depth, transmission frequency, and the like, which can be processed by the video processing apparatus 100. The portable terminal 200 generates a stream in the format including the resolution, color depth, transmission frequency, and the like, which can be processed by the video processing apparatus 100.

The lines MHL+ and MHL− are used to transmit data. The two lines MHL+ and MHL− function as one twist pair line. For example, the lines MHL+ and MHL− function as a TMDS channel used to transmit data based on a TMDS (Transition Minimized Differential Signaling) method. The lines MHL+ and MHL− can transmit a sync signal (MHL clock) of the TMDS method.

For example, the source can output a stream to the sink via the TMDS channel. That is, the portable terminal 200, which functions as the source, transmits a stream obtained by converting video (display screen) displayed on the display 234 and audio output from the loudspeaker 222 to the video processing apparatus 100 as the sink. The video processing apparatus 100 receives the transmitted stream via the TMDS channel, applies signal processing to the received stream, and plays back the processed stream.

FIG. 5 is a block diagram showing the arrangement of the wired communication unit 173 of the video processing apparatus 100 according to one embodiment and a connection example of MHL equipments 200a and 200b. The portable terminal 200 has been described so far, and the two MHL equipments 200a and 200b will be exemplified below. The basic arrangement of the MHL equipments 200a and 200b is the same as that of the portable terminal 200.

As shown in FIG. 2, the wired communication unit 173 includes the connection detection unit 178 and power supply unit 179. The power supply unit 179 supplies electric power via a connected MHL cable in response to a connection detection of the MHL cable. Furthermore, as shown in FIG. 5, the wired communication unit 173 includes HDMI/MHL connectors T1, T2, T3, and T4, each of which can be connected to either an HDMI cable or MHL cable, HDMI controllers 174C1, 174C2, 174C3, and 174C4 which execute signal processing based on the HDMI standard, an MHL controller 175C which executes signal processing based on the MHL standard, and a switching controller 180C.

Processing at the time of connection of an HDMI cable will be described below.

For example, when an HDMI cable is connected to the HDMI/MHL connector T1, a signal supplied from this connected HDMI cable is input via the HDMI/MHL connector T1, and the HDMI controller 174C1 processes the signal input via the HDMI/MHL connector T1.

When an HDMI cable is connected to the HDMI/MHL connector T2, a signal supplied from this connected HDMI cable is input via the HDMI/MHL connector T2, and the HDMI controller 174C2 processes the signal input via the HDMI/MHL connector T2.

When an HDMI cable is connected to the HDMI/MHL connector T3, a signal supplied from this connected HDMI cable is input via the HDMI/MHL connector T3, and the HDMI controller 174C3 processes the signal input via the HDMI/MHL connector T3.

When an HDMI cable is connected to the HDMI/MHL connector T4, a signal supplied from this connected HDMI cable is input via the HDMI/MHL connector T4, and the HDMI controller 174C4 processes the signal input via the HDMI/MHL connector T4.

As described above, the number of HDMI/MHL connectors T1, T2, T3, and T4 is the same as that of HDMI controllers 174C1, 174C2, 174C3, and 174C4, and the connectors and controllers have one-to-one correspondence.

By contrast, the number of HDMI/MHL connectors T1, T2, T3, and T4 is not the same as the number of MHL controllers 175C. For example, in order to suppress manufacturing cost of the video processing apparatus 100, the number of MHL controllers is smaller than that of terminals. This embodiment will explain a case in which the number of terminals is 4, and the number of MHL controllers is 1.

Thus, the switching controller 180C connects the MHL controller 175C and one of the HDMI/MHL connectors T1, T2, T3, and T4 according to a connection state between each connector and MHL cable and a signal transmission/reception state.

FIG. 6 is a circuit diagram for explaining an insertion detection (connection detection) example of an MHL cable. As shown in FIG. 6, an MHL cable includes a resistor R between detection terminals. Note that an HDMI cable does not include any resistor R. Hence, when the wired communication unit 173 applies a voltage across the detection terminals via the HDMI/MHL connectors T1, T2, T3, and T4, the connection detection unit 178 can confirm whether an MHL or HDMI cable is connected to the HDMI/MHL connectors T1, T2, T3, and T4.

For example, the switching controller 180C switches connections as follows.

When an MHL cable connected to the MHL equipment 200a is connected to the HDMI/MHL connector T1, the connection detection unit 178 detects that the MHL cable is connected to the HDMI/MHL connector T1, the switching controller 180C connects the MHL controller 175C and the HDMI/MHL connector T1, and the power supply unit 179 supplies electric power to the MHL equipment 200a via the MHL cable connected to the HDMI/MHL connector T1.

Alternatively, at a detection timing of connecting the MHL cable to the HDMI/MHL connector T1, the power supply unit 179 supplies electric power to the MHL equipment 200a via the MHL cable connected to the HDMI/MHL connector T1. When the MHL controller 175C receives a signal (a content signal such as a video or music) from the MHL equipment 200a via the MHL cable connected to the HDMI/MHL connector T1, it processes the received signal.

Subsequently, when an MHL cable connected to the MHL equipment 200b is connected to the HDMI/MHL connector T3, the connection detection unit 178 detects that the MHL cable is connected to the HDMI/MHL connector T3. At this time, when the MHL controller 175C does not receive any signal (a content signal such as a video or music) from the MHL equipment 200a via the MHL cable connected to the HDMI/MHL connector T1, the switching controller 180C releases (disconnects) the connection between the MHL controller 175C and HDMI/MHL connector T1, and connects the MHL controller 175C and the HDMI/MHL connector T3. Then, the power supply unit 179 supplies electric power to the MHL equipment 200b via the MHL cable connected to the HDMI/MHL connector T3. Note that the power supply unit 179 also keeps supplying electric power to the MHL equipment 200a via the MHL cable connected to the HDMI/MHL connector T1. When the MHL controller 175C receives a signal (a content signal such as a video or music) from the MHL equipment 200b via the MHL cable connected to the HDMI/MHL connector T3, it processes the received signal.

Alternatively, a detection timing of connecting the MHL cable to the HDMI/MHL connector T3, the power supply unit 179 supplies electric power to the MHL equipment 200b via the MHL cable connected to the HDMI/MHL connector T3, and also keeps supplying electric power to the MHL equipment 200a via the MHL cable connected to the HDMI/MHL connector T1.

Alternatively, the connection detection unit 178 detects that the MHL cable is connected to the HDMI/MHL connector T1, and when the MHL controller 175C does not receive any signal from the MHL equipment 200a via the MHL cable connected to the HDMI/MHL connector T1 over a designated period (pre-set period) after the switching controller 180C connects the MHL controller 175C and the HDMI/MHL connector T1, the switching controller 180C may release (disconnect) the connection between the MHL controller 175C and the HDMI/MHL connector T1.

FIG. 7 is a flowchart showing an example of processing at the time of connection of an MHL cable.

When an MHL cable connected to the MHL equipment 200a is connected to the HDMI/MHL connector T1, the connection detection unit 178 detects that the MHL cable is connected to the HDMI/MHL connector T1 (YES in step ST1), the switching controller 180C connects the MHL controller 175C and the HDMI/MHL connector T1, and the MHL controller 175C tries to authenticate the MHL equipment 200a (step ST2).

If the authentication has succeeded (YES in step ST2), the power supply unit 179 supplies electric power to the MHL equipment 200a via the MHL cable connected to the HDMI/MHL connector T1. Note that the connection detection unit 178 detects that the MHL cable is connected to the HDMI/MHL connector T1, and the power supply unit 179 may supply electric power to the MHL equipment 200a via the MHL cable connected to the HDMI/MHL connector T1 in response to this detection.

If the MHL controller 175C receives a signal (a content signal such as a video or music) from the MHL equipment 200a via the MHL cable connected to the HDMI/MHL connector T1 (YES in step ST3), it processes the received signal (step ST5).

If the authentication has failed (NO in step ST2), the switching controller 180C releases (disconnects) the connection between the MHL controller 175C and the HDMI/MHL connector T1 (step ST4). If a state in which the MHL controller 175C does not receive any signal (a content signal such as a video or music) from the MHL equipment 200a via the MHL cable connected to the HDMI/MHL connector T1 continues over the designated period (NO in step ST3), the switching controller 180C releases (disconnects) the connection between the MHL controller 175C and the HDMI/MHL connector T1 (step ST4).

The embodiment will be summarized below.

Although HDMI and MHL input terminals are normally commonly used, MHL controllers as many as the number of all input terminals are not often equipped for the sake of a cost reduction. Also, in a certain operation mode, an MHL controller is used as a power supply trigger to an external apparatus connected via an MHL cable, and is not practically used after the beginning of power supply to the external apparatus. When such operation mode is adopted, the scarce MHL controller can be effectively used by the aforementioned switching processing of the switching controller 180C.

For example, the MHL controller 175C detects the presence/absence of a signal (content signal) from an external apparatus connected via an MHL cable, and discriminates whether the external apparatus is connected for the power supply purpose or to enjoy the content of the external apparatus. Then, the switching controller 180C controls connection, release (disconnection), or the like according to the discrimination result.

According to this embodiment, a cost reduction and improvement of convenience can be attained at the same time.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a plurality of terminals;
   a first controller configured to connect with one of the plurality of terminals and to process a signal from the connected terminal;
   a detector configured to detect a connection between each of the plurality of terminals and an MHL cable compliant with an MHL standard;
   a power supply module configured to supply electric power to a first connected apparatus connected via a first MHL cable in response to a first connection detection between a first terminal and the first MHL cable; and
   a second controller configured to connect the first terminal and the first controller in response to the first connection detection, and to connect a second terminal and the first controller when a signal is not received from the first connected apparatus via the first terminal at a timing of a second connection detection between the second terminal and a second MHL cable.

2. The apparatus of claim 1, wherein the second controller is configured to connect the first terminal and the first controller in response to the first connection detection, and to release the connection between the first terminal and the first controller and to connect the second terminal and the first controller when a signal is not received from the first connected apparatus via the first terminal at the second connection detection timing.

3. The apparatus of claim 1, wherein the second controller is configured to connect the first terminal and the first controller in response to the first connection detection, and to release the connection between the first terminal and the first controller when a signal is not received from the first connected apparatus via the first terminal over a designated time.

4. The apparatus of claim 1, wherein the second controller is configured to connect the second terminal and the first controller when a content signal is not received from the first connected apparatus via the first terminal at the second connection detection timing.

5. The apparatus of claim 1, wherein the power supply module is configured to keep supplying electric power to the first connected apparatus connected via the first MHL cable even after the second connection detection.

6. The apparatus of claim 1, wherein the power supply module is configured to supply electric power to a second connected apparatus connected via the second MHL cable in response to the second connection detection.

7. The apparatus of claim 1, wherein the first controller is configured to authenticate the first connected apparatus connected via the first MHL cable, and to authenticate a second connected apparatus connected via the second MHL cable.

8. The apparatus of claim 7, wherein the second controller is configured to release the connection between the first terminal and the first controller in response to an authentication error of the first connected apparatus connected via the first MHL cable.

9. The apparatus of claim 8, wherein the second controller is configured to release the connection between the first terminal and the first controller when a signal is not received from the first connected apparatus via the first terminal over a designated time after authentication of the first connected apparatus connected via the first MHL cable has succeeded.

10. The apparatus of claim 1, wherein each of the plurality of terminals is an HDMI/MHL terminal configured to connect with one of an HDMI cable and an MHL cable.

11. The apparatus of claim 10, further comprising a plurality of HDMI controllers corresponding to the plurality of terminals,
  wherein the first controller connected to one of the plurality of terminals is an MHL controller.

12. An information processing method comprising:
  detecting a first connection between a first terminal and a first MHL cable compliant with an MHL standard;
  supplying electric power to a first connected apparatus connected via the first MHL cable in response to the first connection detection;
  connecting the first terminal and a controller configured to process a signal from the first terminal in response to the first connection detection;
  detecting a second connection between a second terminal and a second MHL cable compliant with the MHL standard; and
  connecting the second terminal and the controller configured to process a signal from the second terminal when a signal is not received from the first connected apparatus via the first terminal at a timing of the second connection detection.

\* \* \* \* \*